(12) United States Patent
Schuster et al.

(10) Patent No.: US 8,211,219 B2
(45) Date of Patent: Jul. 3, 2012

(54) FILTER WITH EXCHANGEABLE INSERT

(75) Inventors: Hans-Michael Schuster, Haan (DE); Jens Schäfer, Korschenbroich (DE); Abdelkhalic Rbayti, Düsseldorf (DE); Peter Groth, Ratingen (DE)

(73) Assignee: Donaldson Filtration Deutschland GmbH, Haan (DE)

( * ) Notice: Subject to any disclaimer, the term of this patent is extended or adjusted under 35 U.S.C. 154(b) by 641 days.

(21) Appl. No.: 12/304,649

(22) PCT Filed: Jun. 21, 2007

(86) PCT No.: PCT/EP2007/005478
§ 371 (c)(1),
(2), (4) Date: Mar. 13, 2009

(87) PCT Pub. No.: WO2007/147598
PCT Pub. Date: Dec. 27, 2007

(65) Prior Publication Data
US 2010/0058930 A1 Mar. 11, 2010

(30) Foreign Application Priority Data
Jun. 21, 2006 (EP) .................................. 06012773

(51) Int. Cl.
*B01D 49/00* (2006.01)
(52) U.S. Cl. ............ 96/421; 96/147; 55/318; 55/317; 55/315; 55/413; 55/414; 55/416; 55/462; 55/465; 55/498; 55/DIG. 17; 55/507; 55/505; 55/467; 55/504; 55/508; 55/410; 55/418; 55/510; 210/443; 210/444

(58) Field of Classification Search ............... 55/318, 55/317, 315, 413, 414, 416, 462, 465, 498, 55/DIG. 17, 507, 505, 467, 504, 508, 410, 55/418, 510; 96/421, 147; 210/443, 444
See application file for complete search history.

(56) References Cited

U.S. PATENT DOCUMENTS

| 4,925,466 A | 5/1990 | Overby |
| 7,550,023 B2 | 6/2009 | Schuster et al. |
| 2004/0035097 A1* | 2/2004 | Schlensker et al. ............ 55/498 |
| 2007/0084785 A1* | 4/2007 | Schuster et al. ............. 210/435 |
| 2007/0271884 A1* | 11/2007 | Pearson et al. ................. 55/410 |

FOREIGN PATENT DOCUMENTS

| DE | 25 06 359 A1 | 10/1975 |
| DE | 35 41 370 A1 | 5/1986 |
| DE | 100 52 524 A1 | 4/2002 |
| DE | 103 09 428 | 9/2004 |
| WO | WO 2004/091751 | 10/2004 |
| WO | WO 2006/013333 | 2/2006 |

\* cited by examiner

*Primary Examiner* — Jason M Greene
*Assistant Examiner* — Dung H Bui
(74) *Attorney, Agent, or Firm* — Henry M. Feiereisen; Ursula B. Day

(57) ABSTRACT

A filter, in particular for compressed gas systems, includes a filter top part having at least one inlet channel and at least one outlet channel and a filter bottom part having a filter element, wherein the filter top part has a pressure-resistant housing and an insert which is suited in an optimal manner to the course of the inlet and outlet channels.

18 Claims, 5 Drawing Sheets

FILTER WITH EXCHANGEABLE INSERT

BACKGROUND OF THE INVENTION

The invention relates to a filter, in particular for compressed gas and compressed air systems.

Compressed gas systems, in particular compressed air systems require filters to separate solid and liquid foreign matters, for example dirt particles, condensate, and oil, that are carried in the gas flow.

Such filters normally are made of a two-part housing with a top part and a bottom part which are either bolted with one another or connected with one another by means of a coupling nut or a bayonet coupling. The housing top part normally has on diametrically opposite sides an inlet channel and an outlet channel. The inlet channel feeds either in midsection into a hollow-cylindrical filter element arranged in the bottom part or into the annular space between the filter element and the housing of the bottom part. As a result, the outlet channel extends either from the annular space or from the interior of the filter element, depending on whether the flow through the filter element is from inside to the outside or from the outside to the inside. The flow direction in the filter is therefore established after installation and cannot be changed in the installation position. In addition to the flow direction, also the field of application of the filter is established because the flow through the filter element is from outside to inside when dust filtering is involved, and from inside to outside when coalescence filtering for separating compressed air condensate is involved. The majority of conventional filters are thus suitable either exclusively as dust filters or exclusively as coalescence filters, when the flow direction is established after installation into the compressed air system.

DE 103 09 428 B4 discloses a filter having an attachment flange arranged between the top part of the filter and the hollow-cylindrical filter element arranged in the bottom part, with the attachment flange having a feed channel, which is in communication with the filter chamber formed in the interior of the cylindrical filter element, and having a drain channel, which feeds into the annular chamber between the filter element and the bottom part of the housing. By way of a point-symmetric configuration of the filter-element-confronting openings of the inlet and outlet channels in the top part of the filter, the inlet channel or the outlet channel of the filter can be connected with the filter chamber through selective rotation of the attachment flange. As a result, the flow direction of the filter element can be changed through selective rotation of the attachment flange.

When using such filters in a compressed gas or compressed air system, the components of the filter must be sized to withstand the applied pressures. For that reason, the housing parts of the filter are normally manufactured from metal, in particular aluminum. This normally applies also for the top part of the filter (filter head) which has the inlet and outlet channels, as disclosed in the afore-mentioned DE 103 09 428 B4 for example.

The inlet channel as well as also the outlet channel includes in the filter head of DE 103 09 428 B4 a horizontal straight section which connects via a 90° bend into a vertical section. When the filter head is constructed as a milled aluminum component or as a cast aluminum component, such a course of the inlet and outlet channels can be realized in a simple manner by two milled holes which meet within the component. The flow dynamics of such a course of the inlet and outlet channels is however not optimal. In order to optimize the differential pressure, a course that is as even as possible, i.e. in particular without edges and shoulders, and a great length of the channels are desirable.

SUMMARY OF THE INVENTION

The present invention is thus based on the object to provide an improved filter to address at least one of the prior art shortcomings. In particular a filter should be provided which further optimizes flow dynamics.

This object is attained by the subject matter of the independent claims. Advantageous embodiments are the subject matter of the dependent claims.

The essence of the invention is the provision of a filter of the afore-stated type having a top part with at least an inlet channel and an outlet channel and a bottom part to receive the filter element, whereby the top part includes a housing and an insert in which the inlet and outlet channels extend.

As a result of the split configuration of the top part of the filter in accordance with the invention, these two components—the housing and the insert—can be configured to provide optimum functions. The housing in particular can be optimized to compensate the applied excess pressure in the inner filter chamber whereas the insert can be configured to realize a course of the inlet and outlet channels that is as advantageous as possible. Preferably, the insert may be rotatably secured within the housing.

According to the invention, the inlet and/or outlet channel may be received in the insert about its entire circumference so that the channel walls thereof are formed in part by the insert and in part by one or more other components of the filter.

According to an advantageous embodiment of the present invention, the housing is manufactured of a metal, preferably aluminum. In this way, high excess pressures can be compensated, even when the wall thicknesses of the housing is slight.

The insert is preferably made of plastic. In view of the numerous possibilities to make and finish (even complex) plastic structures, an optimized and at the same time complex course of the inlet and outlet channels can be realized in a simple manner. The split construction of the filter top part enables to select an insert material that can have reduced pressure-resistance because the insert is protected by the preferably pressure-resistant housing.

The insert is preferably arranged exchangeably within the housing. Thus, when the filter top part becomes defective, only the respectively defective component (housing or insert) is required to be replaced, which is cost-efficient. The option to replace the insert further permits also to selectively connect a uniform housing with a number of inserts which, for example, have a course of the inlet and outlet channels suited to different filter elements used in the filter.

In order to integrate the filter according to the invention is an existing system, for example a compressed air system, the housing has inlet and outlet openings which coincide (at least partially) with respective openings of the inlet and outlet channels of the insert. These inlet and outlet openings of the housing are preferably integrated in connection elements. Such a connection element may for example be implemented as inner or outer thread which is easy to make in particular when a metallic housing is involved. Preferably, the connection elements are designed with generally known quick-action locks used in the respective systems.

According to an advantageous embodiment of the present invention, the inlet channel or the outlet channel feeds directly or indirectly into a filter chamber bounded by the filter material of the filter element, while the other one of these channels feeds into a collector chamber which is formed by the filter element and the bottom part of the filter. The terms filter chamber and collector chamber are not functionally limited but are merely used to differentiate between both volumes. In particular the volume called "filter chamber" may operate as collector chamber when reversing the flow direction.

According to a further advantageous embodiment, the filter element has an attachment element which is arranged between the top part of the filter and the filter element. The attachment element is preferably connected non-detachably or detachably with the filter element so as to allow exchange therewith. The attachment element has at least one feed channel and a drain channel, with one of the channels being constructed such as to connect the filter chamber, formed by the filter element, with the inlet or outlet channel of the filter top part, while the other channel connects the collector chamber, defined by the filter element and the filter bottom part, with the respectively other channel (inlet or outlet channel).

The use of such an attachment element is especially advantageous when being configured rotatable in relation to the top part and when a mirror or point symmetry of the filter-element-confronting openings of the inlet and outlet channels afford the possibility to selectively connect the filter chamber with either the inlet channel or the outlet channel and thus to modify the throughflow direction of the filter element.

In particular, when such an embodiment of the filter according to the invention is involved, hollow-cylindrical filter elements are preferably utilized. The filter is hereby preferably configured in such a way that the length axis of the cylindrical filter element defines the rotation axis of the attachment element as well as the pivot point of the point-symmetric openings of the inlet and outlet channels of the filter top part.

Such hollow-cylindrical filter elements are preferably constructed in such a manner that the (cylinder) jacket—at least partially—is made of filter material which may be made of several layers of different filter material. Such hollow-cylindrical filter elements can be made cost-efficiently and are characterized further by a beneficial ratio of installation space to effective filter area.

The mirror-symmetric or point-symmetric openings of the inlet and outlet channels are preferably configured in the form of a kidney or a semicircle. In this way, two greatest possible openings that enhance flow dynamics and are separated from one another only by a relatively narrow ridge can be configured, when a circular attachment surface is involved.

According to an advantageous embodiment of the present invention, the filter element has a guide element which conducts and possibly deflects the flow of medium to be filtered in a desired direction. Advantageously, the guide element is situated in a region in which the feed or drain channel and the inlet of outlet channel, respectively, feeds into the filter chamber. The flow of the medium to be filtered is preferably conducted in the direction of the length axis of the filter element, when the filter element is preferably cylindrical.

The guide element may be fixedly mounted or exchangeably mounted on the filter element. If the filter element is connected with an afore-described attachment element, the guide element may also be integrated in this attachment element or mounted thereon.

The guide element is preferably designed as a surface portion of part-circular shape. The guide element can have any shape, for example tubular or planar, in dependence in which direction the medium to be filtered flows when entering the filter chamber.

According to an advantageous embodiment of the present invention, the length axis (axes) of the inlet and/or outlet channel has a three-dimensionally curved course. This means, in contrast to prior art filters, like for example in DE 103 09 428 B4, the course of the inlet and/or outlet channel is curved not only in one plane (i.e. curved two-dimensionally) but has an additional bend in at least a second plane which is not parallel to the first plane. The (central) length axis of the inlet and/or outlet channels thus has in any event a three-dimensionally curved course.

In other words, the advantageous configuration of the inlet and outlet channels may also be described as follows: The radius of the arc of the respective channel is greater than half the diameter of the filter top part.

As a consequence of such a course of the inlet and/or outlet channel in accordance with the invention, the available space in the filter top part can be utilized in an optimum manner and greater channel lengths can be realized compared to known prior art courses of the inlet and outlet channels.

The insert of the filter top part has preferably at least one pocket for a functional component. Such a functional component may involve in particular a transducer of a differential pressure indication. The transducer of the differential pressure indication may be fixedly integrated in the insert of the filter upper part. The transducer is however preferably exchangeably connected with the insert of the filter top part so as to be re-usable when the inserts is replaced. An exchangeable transducer has also the advantage that it can be used with various inserts of the filter top part that are suited to different filter elements.

Exemplified embodiments of the invention will now be described in greater detail with reference to the drawings.

DETAILED DESCRIPTION OF PREFERRED EMBODIMENTS

Figure 1:
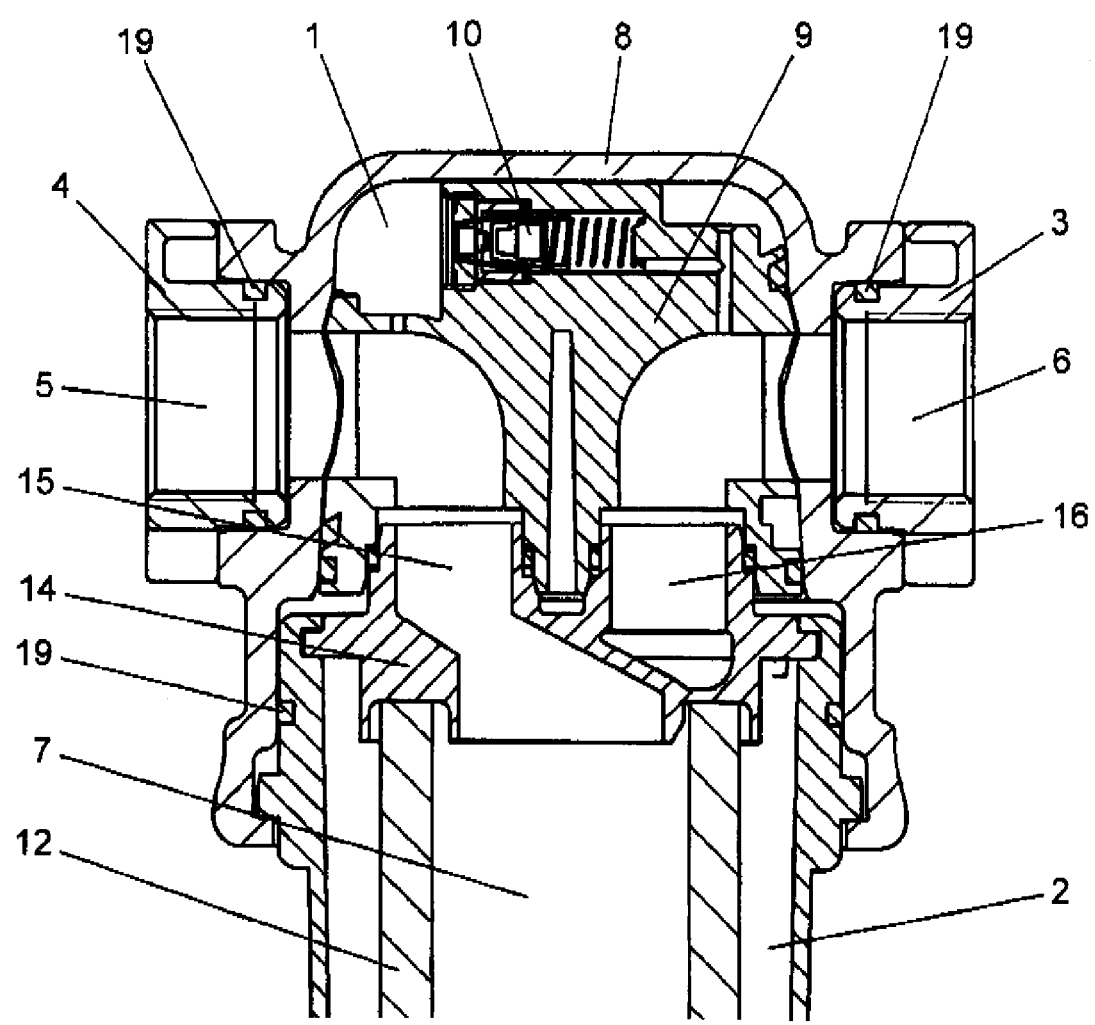
FIG. 1 a sectional side view of part of a filter according to a first embodiment of the invention.

A filter according to a first embodiment of the present invention (FIG. 1) includes a filter top part 1 as well as a filter bottom part 2.

The filter top part 1 includes in addition to two attachment flanges 3, 4 for incorporation of the filter in an existing compressed air system an inlet channel 5 and an outlet channel 6 for connection of the attachment flanges 3, 4 with the interior space of a cylindrical filter element 7 and with a ring-shaped (filter or collector) chamber, defined by the outer surface of the filter element 7 and the inner surface of the hollow-cylindrical filter bottom part 2.

The filter top part 1 has a pressure-resistant aluminum housing 8 within which the insert 9 made of plastic and including the inlet and outlet channels 5, 6 is arranged. The insert 9 of the filter top part 1 has in addition to the inlet and outlet channels 5, 6 a transducer 10 of a differential pressure indication (not shown) which is exchangeably mounted in a pocket of the insert 9.

The differential pressure transducer 10 measures the pressure differential between the inlet channel 5 and the outlet channel 6 for determining the pressure drop caused by the filter element 7 as a result of progressing contamination. The pressure drop is displayed on an unillustrated differential pressure indication which is preferably arranged directly on the filter and indicates the need for a change of the filter elements in the event of an excessive contamination of the filter element 7.

The filter element 7 has a cylindrical jacket 12 which is made of a filter material. Various filter materials generally known in the prior art can be used depending on the intended application.

Figure 2:
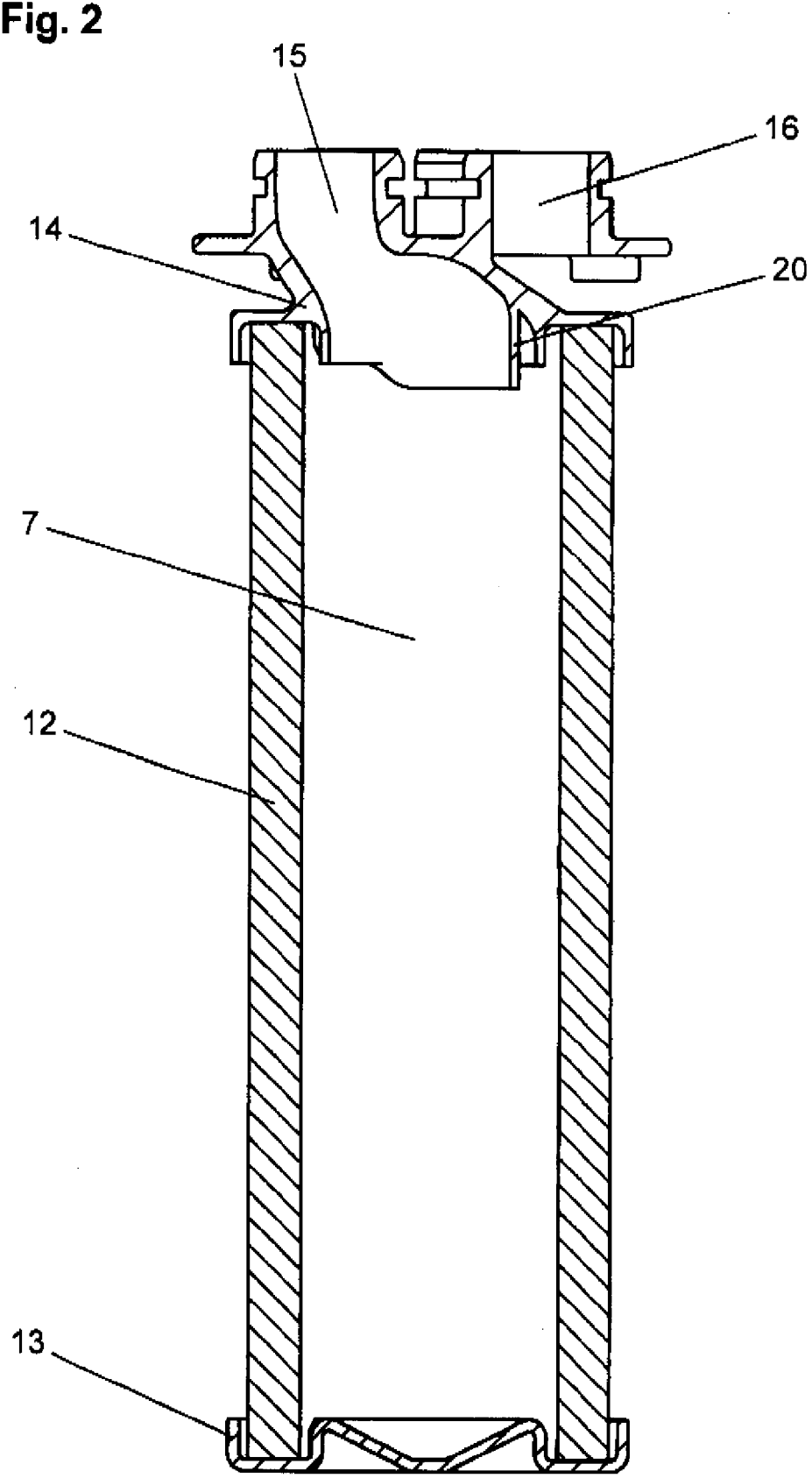
FIG. 2 a sectional detailed side view of a filter element, as possibly used in the embodiment of a filter according to FIG. 3.

The bottom side of the filter element 7 is closed by means of a circular end piece 13 (cf. FIG. 2). In the assembled position, an attachment element 14 is attached to the upper opening of the hollow-cylindrical filter element 7 and is firmly glued with the filter material in the present embodiment so as to constitute an integral component of the filter element 7.

The attachment element 14 has two channels 15, 16 in direct communication with the inlet and outlet channels 5, 6 of the filter top part. In the depicted position of the filter element, the first channel 15 (thus assuming a function as feed channel), having a S-shaped course, connects the inlet channel 5 of the filter top part 1 with the inner volume (filter chamber) of the filter element 7, whereas the second channel 15 (thus assuming a function as drain channel), connects the outlet channel 6 of the filter top part 1 with the annular space (collector chamber) formed between the filter element 7 and the filter bottom part 2. In the depicted position, the flow through the filter element is from inside to outside.

The openings of the inlet and outlet channels 5, 6 in confronting relationship to the filter element 7 as well as the respective coinciding openings of the two channels 15, 16 of the attachment element 14 are configured in point-symmetry in relation to a 180° rotation about the length axis of the filter element 7. The filters, shown in FIGS. 1 and 3, thus afford the possibility to connect the two channels 15, 16 of the attachment element 14 with either the inlet channel 5 or the outlet channel 6 through a 180° rotation of the attachment element 14 (or the entire filter element 7) so as to reverse the flow direction of the filter element 7. The filters, shown in FIGS. 1 and 3, can thus be used for dust filtering, with the flow through the filter element being from outside to inside, as well as coalescence filtering, with the flow through the filter element being from inside to outside. As an exchange of the filter type of a used filter is rather the exception, the reversibility of the flow direction through the filter element has advantages as far as manufacturing is concerned because identical filters can be used for the two filter types.

To ensure a simple and precise assembly of the filter element 7 in both possible positions, the filter shown in FIG. 1 has a connection in the form of a bayonet coupling between the filter top part 1 and the filter bottom part 2.

The filter bottom part 2 including the filter element 7 can be dismantled by initially lifting it slightly in direction of the filter top part 1 and separating it from the filter top part following a 90° rotation.

The attachment flanges 3, 4 of the filter are made as separate components which are connected to the housing 8 of the filter top part 1 by means of a bolted connection. As an alternative embodiment of the invention, these components may also be directly integrated in the housing 8.

Leakage of compressed air from the filter is prevented—where required—by O-ring seals 19.

The filter element of FIG. 2 differs from the one of FIG. 1 in the arrangement of a part-circular guide element 20 at the mouth of the channel 15 leading into the filter interior. The guide element deflects the air flow, which enters the filter interior laterally/obliquely (i.e. not centrally) as a consequence of the S-shaped course of the channel 15, in a direction in parallel relationship to the length axis of the filter element 7. The guide element 20 thus enables a better distribution of compressed air across the entire filter surface.

Figure 3:
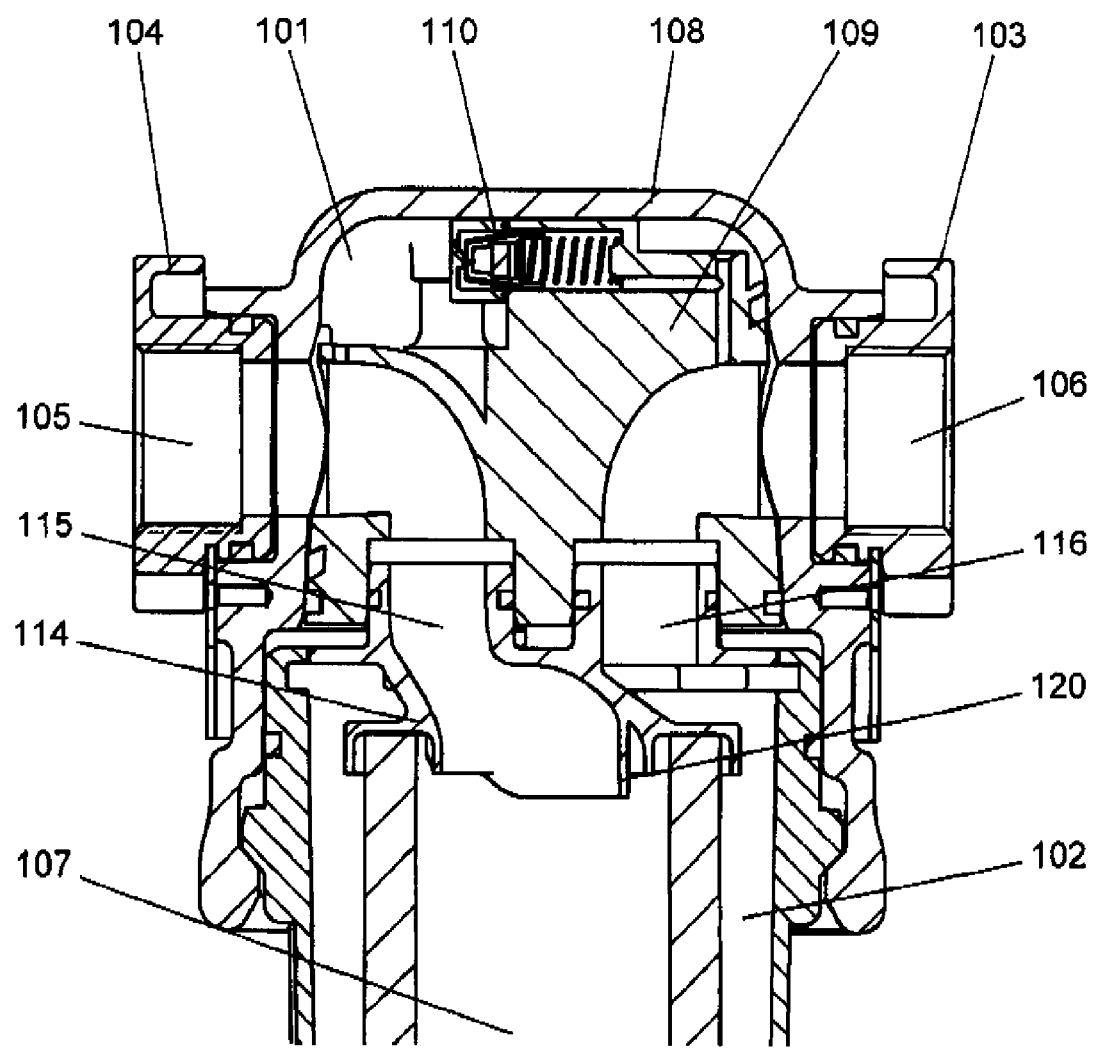
FIG. 3 a sectional side view of part of a filter according to a second embodiment of the invention.

FIG. 3 shows a second embodiment of a filter according to the invention which differs only insignificantly from the embodiment of a filter shown in FIG. 1 as far as function and basic configuration are concerned.

In correspondence with the filter of FIG. 1, the filter shown in FIG. 3 has a filter top part 101 with a pressure-resistant housing 108 of aluminum and connected attachment flanges 103, 104. An insert 109 of plastic is arranged in the housing and has an inlet channel 105 and an outlet channel 106 as well as a transducer 110 for a differential pressure indication (not shown). A hollow-cylindrical filter element 107, including an attachment element 114 having two channels 115, 116, is arranged in the filter bottom part 102.

Unlike the attachment element 14 of the filter according to FIG. 1, the channel 115 of the attachment element 114 to connect the inlet channel 105 of the filter top part 102 with the inner volume of the filter element 107 does not have a S-shape but is configured at a slant (in relation to the length axis of the filter element 107) and straight. Arranged at the site where the channel 115 feeds into the inner volume of the filter element 107 is a guide element 120, which in this case has a circular cross section.

In the embodiments of the filter according to FIGS. 1 and 3, the inlet channel (5; 105) as well as the outlet channel (6; 106) have a curved, i.e. two-dimensional, course in a plane (the drawing plane). Starting from the attachment flanges (3, 4; 103, 104), they extend initially horizontal radially in relation to the length axis of the filter element (7; 107) or the filter until the course undergoes a 90° bend to extend in parallel relationship to the length axis. Such a course of the inlet and outlet channels (5, 6, 105, 106) is limited by the width (or the diameter) of the insert (9; 109) (or the filter top part (1; 101)) in view of the need to structurally separate between the inlet and outlet channels (5, 6; 105, 106). In order to optimize the differential pressure, it may be desirable to provide longest possible inlet and outlet channels (5, 6; 105, 106).

The invention thus provides preferably a filter according to the invention having inlet and/or outlet channels which (or their length axes) exhibit a three-dimensionally curved course to thereby realize a greater channel length.

Figure 4:
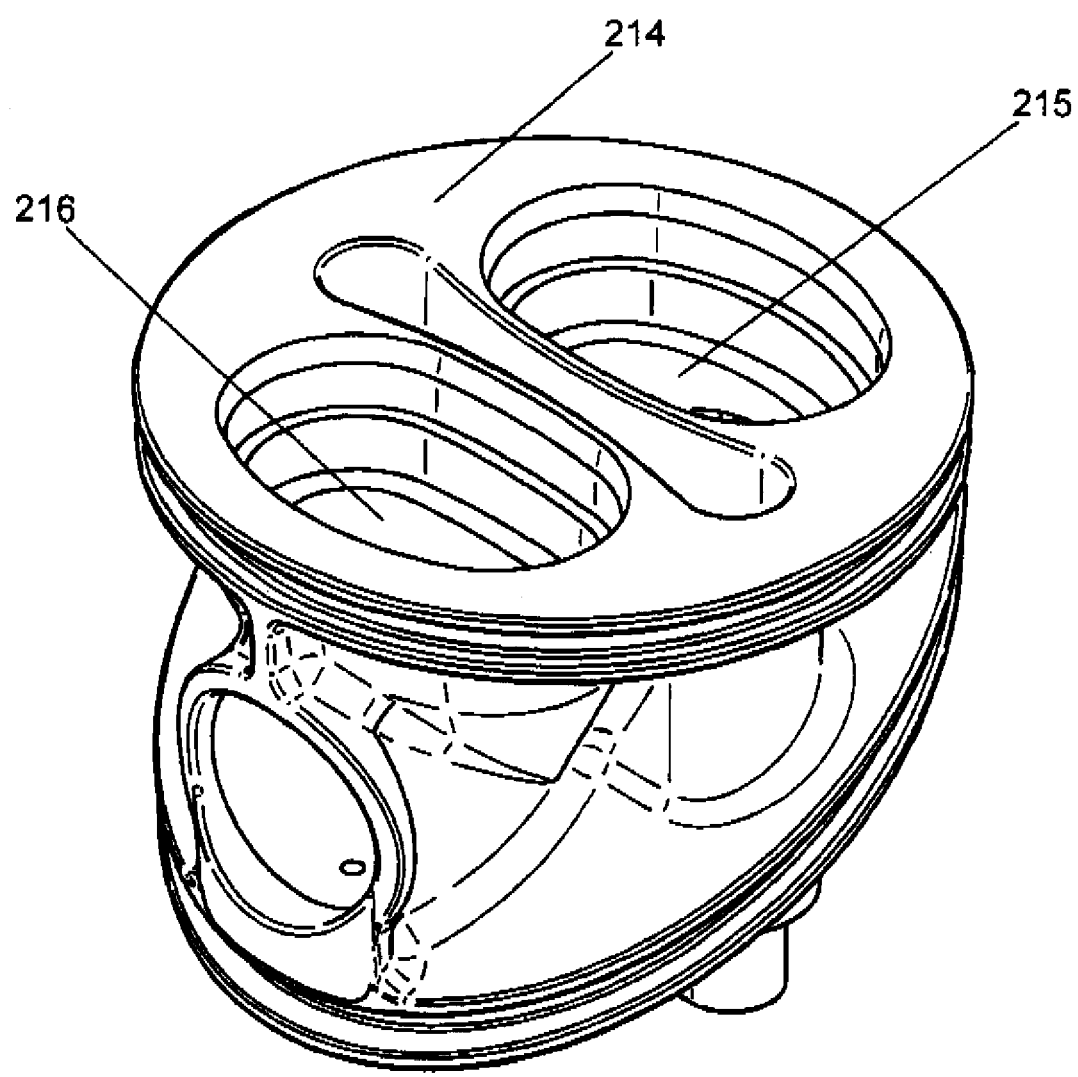
FIG. 4 a perspective view of a first embodiment of an insert of a filter top part in accordance with the invention, as possibly used in the embodiment of a filter according to FIG. 1.
Figure 5:
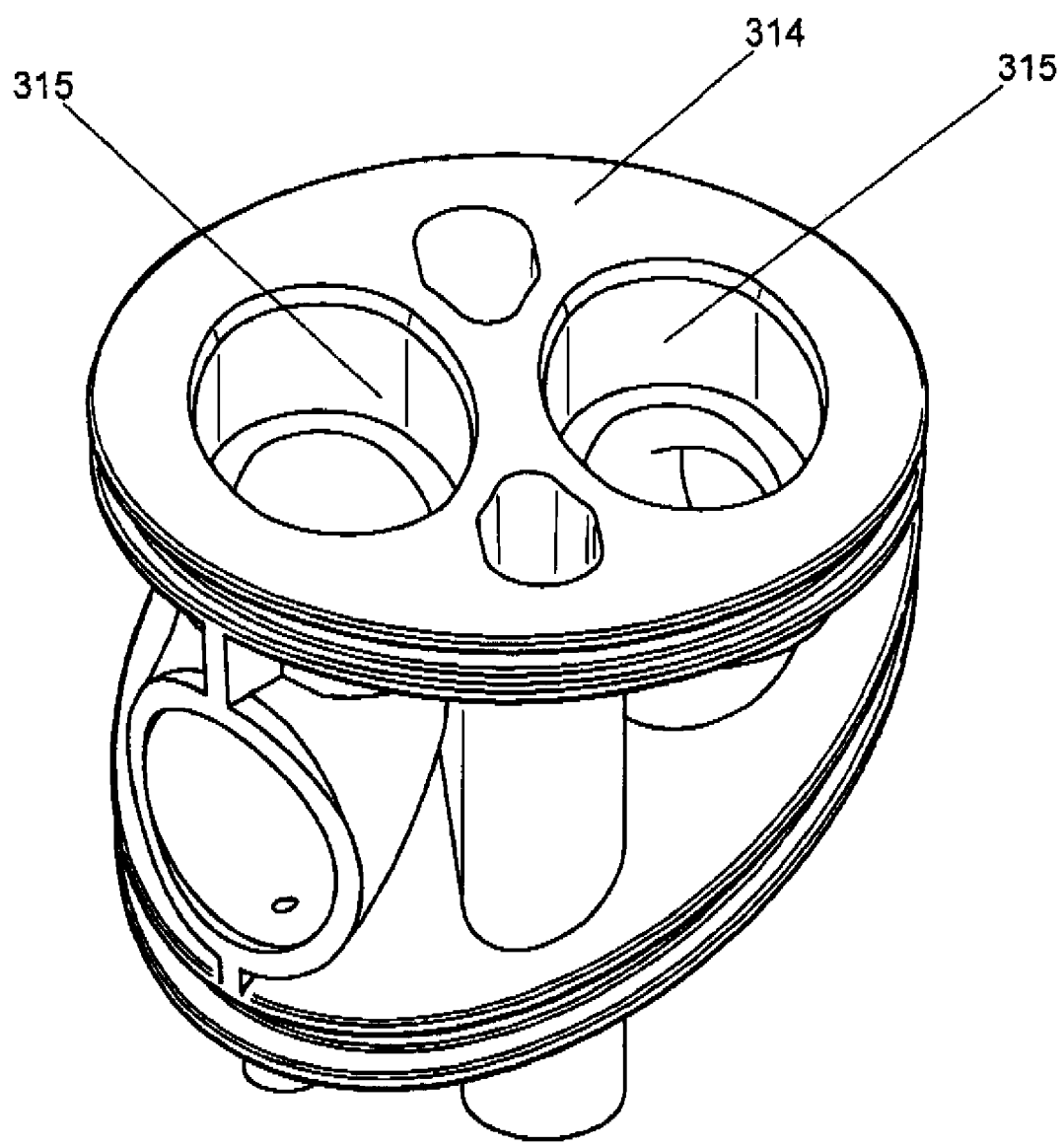
FIG. 5 a perspective view of a second embodiment of an insert of a filter top part in accordance with the invention, as possibly used in the embodiment of a filter according to FIG. 3.

Corresponding inserts, as they can be used in a filter according to the invention having a filter top part of a pressure-resistant housing and an insert having the inlet and outlet channels, illustrated for example in FIGS. 1 and 3, are depicted in FIGS. 4 and 5.

The channels (215, 216; 315, 316) of the inserts (214; 314) according to FIGS. 4 and 5 have a three-dimensionally curved course. Unlike the inlet and outlet channels (5, 6; 105, 106) according to FIGS. 1 and 2, the channel length axes do not extend in a single plane (i.e. two-dimensional) but three-dimensionally relative to one another. In other words: The courses of the inlet and outlet channels (215, 216; 315, 316) of the inserts according to FIGS. 4 and 5 differ from the one of FIGS. 1 and 3 i.a. that they—starting from the connection openings for the filter element in direction of the channel course—execute an additional angular rotation of the channel about the own length axis.

In view of the complexity of the course of the channels of the inserts of FIGS. 4 and 5 in accordance with the invention, the latter are difficult to manufacture. The filter of FIGS. 1 and 3 in accordance with the invention which respectively can have a filter top part with a pressure-resistant housing of aluminum and a plastic insert which allows also complex channel courses and is preferably exchangeable, advantageously enables the efficient manufacture of a filter with the curved inlet and outlet channels in accordance with the invention.

What is claimed is:

1. A filter, comprising:
   a top part having a housing;
   a separate insert received in the housing of the top part and having at least an inlet channel and at least an outlet channel;
   a bottom part; and
   a filter element received in the bottom part,
   the housing having an inlet opening and an outlet opening, said inlet and outlet openings partially overlapping openings of the inlet and outlet channels of the insert, said inlet and outlet channels formed in the insert having a three-dimensionally curved course.

2. The filter of claim 1, wherein the insert is detachably mounted in the housing.

3. The filter of claim 1, wherein the insert is mounted rotatably within the housing.

4. The filter of claim 1, wherein the housing is designed pressure-resistant, and the insert is designed differential pressure resistant.

5. The filter of claim 1, wherein the curved course of the inlet and outlet channels defines a radius of an arc which is greater than half a diameter of the top part.

6. The filter of claim 1, wherein the housing has at least one inlet opening and an outlet opening which at least partially overlap respective openings of the inlet and outlet channels of the insert and are integrated in attachment elements configured for attachment to external lines.

7. The filter of claim 1, wherein the inlet and outlet channels have openings in confronting relationship to the filter element, said opening being mirror-symmetric or point-symmetric.

8. The filter of claim 7, wherein the opening of at least one of the inlet channel and outlet channel has the shape of a kidney or a semicircle.

9. The filter of claim 1, wherein the insert has at least one pocket for a functional component.

10. The filter of claim 9, wherein the functional component is a transducer of a differential pressure indication.

11. The filter of claim 1, wherein the filter element has a hollow-cylindrical configuration.

12. The filter of claim 11, wherein the hollow-cylindrical filter element has a jacket which is made at least in part of filter material.

13. The filter of claim 1, wherein one of the inlet and outlet channels feeds directly or indirectly into a filter chamber defined by the filter element and the other one of the inlet and outlet channel feeds directly or indirectly into a collector chamber formed by the filter element and the bottom part.

14. The filter of claim 13, wherein the filter element has an attachment element with a feed channel and a drain channel to connect the filter chamber and the collector chamber with the inlet and outlet channels.

15. The filter of claim 14, wherein the filter element has at least one guide element in a mouth area of the feed channel and the drain channel into the filter chamber.

16. The filter of claim 14, wherein the attachment element is rotatable in relation to the top part so that the filter chamber is selectively connectable with the inlet and outlet channels.

17. A filter, comprising
   a top part having at least one inlet and outlet channel;
   a bottom part; and
   a filter element received in the bottom part and defining a filter chamber,
   wherein the inlet channel connects the filter chamber with a first connection opening, and the outlet channel connects a collector chamber, formed by the filter element and the bottom part, with a second connection opening,
   wherein the inlet and outlet channel has a three-dimensionally curved course.

18. The filter of claim 17, wherein the inlet and outlet channels define a radius of an arc which is greater than half a diameter of the top part.

* * * * *